(12) United States Patent
Miller et al.

(10) Patent No.: US 7,675,524 B1
(45) Date of Patent: Mar. 9, 2010

(54) IMAGE PROCESSING USING ENCLOSED BLOCK CONVOLUTION

(75) Inventors: Gavin S. P. Miller, Los Altos, CA (US); Nathan A. Carr, Santa Clara, CA (US)

(73) Assignee: Adobe Systems, Incorporated, San Jose, CA (US)

( * ) Notice: Subject to any disclaimer, the term of this patent is extended or adjusted under 35 U.S.C. 154(b) by 453 days.

(21) Appl. No.: 11/749,862

(22) Filed: May 17, 2007

(51) Int. Cl.
G09G 5/00 (2006.01)
G09G 5/37 (2006.01)
G06F 1/00 (2006.01)
G06F 17/00 (2006.01)
G06K 9/40 (2006.01)
G06K 9/64 (2006.01)
G06K 9/32 (2006.01)

(52) U.S. Cl. ........................ 345/586; 345/581; 345/606; 345/643; 345/561; 358/524; 358/525; 382/171; 382/254; 382/279; 382/300; 708/5; 708/207; 708/290; 708/315

(58) Field of Classification Search .................. 345/428, 345/581, 586–587, 606, 613–615, 635, 501, 345/643–644, 505–506, 547–549, 560–561, 345/692, 698; 358/524–525, 448, 453; 382/168–173, 382/254, 260, 274, 282, 276–279, 300–305
See application file for complete search history.

(56) References Cited

U.S. PATENT DOCUMENTS

| 4,947,446 A | 8/1990 | Jutand |
| 5,168,375 A | 12/1992 | Reisch |
| 5,426,684 A | 6/1995 | Gaborski et al. |
| 5,471,987 A | 12/1995 | Nakazawa et al. |
| 5,681,112 A | 10/1997 | Kuroda |
| 6,034,690 A | 3/2000 | Gallery |
| 6,158,519 A * | 12/2000 | Kretschmer .................. 169/16 |
| 6,163,621 A | 12/2000 | Paik et al. |
| 6,347,153 B1 | 2/2002 | Triplett et al. |
| 6,496,187 B1 * | 12/2002 | Deering et al. .............. 345/419 |
| 6,956,582 B2 | 10/2005 | Tidwell |

(Continued)

OTHER PUBLICATIONS

U.S. Appl. No. 11/756,402, filed May 31, 2007.

(Continued)

Primary Examiner—Wesner Sajous
(74) Attorney, Agent, or Firm—Robert C Kowert; Meyertons, Hood, Kivlin, Kowert & Goetzel, P.C.

(57) ABSTRACT

A system and method for performing convolutions on image data using pre-computed acceleration data structures is disclosed. The method may include calculating intermediate convolution values for each of a plurality of blocks of pixels by performing an associative operation on the pixel values in each block. Each intermediate value may be associated with the block and indexed dependent on index values of pixels in the block. An image pyramid may include intermediate convolution values for multiple levels of acceleration by calculating intermediate convolution values for multiple block sizes. A convolution result for a kernel of an image may be produced by performing the associative operation on intermediate convolution values for non-overlapping blocks enclosed within the kernel and on pixel values associated with pixels in the kernel but not in one of the non-overlapping blocks. The methods may be implemented by program instructions executing in parallel on CPU(s) or GPUs.

33 Claims, 5 Drawing Sheets

U.S. PATENT DOCUMENTS

| | | | |
|---|---|---|---|
| 7,010,163 | B1 | 3/2006 | Weiss |
| 7,072,528 | B2 | 7/2006 | Han |
| 7,146,059 | B1 | 12/2006 | Durand et al. |
| 7,239,756 | B2 | 7/2007 | Sartor |
| 7,317,781 | B2 | 1/2008 | Urushiya |
| 2002/0070944 | A1* | 6/2002 | Deering ............... 345/581 |
| 2004/0264799 | A1 | 12/2004 | Gallagher |
| 2006/0110063 | A1 | 5/2006 | Weiss |
| 2007/0183682 | A1 | 8/2007 | Weiss |

OTHER PUBLICATIONS

U.S. Appl. No. 11/756,409, filed May 31, 2007.
Crow, "Summed-Area Tables for Texture Mapping," Computer Graphics, vol. 18, No. 3, Jul. 1984, pp. 207-212.
Williams, "Pyramidal Parametrics", Computer Graphics, vol. 17, No. 3, Jul. 1983, pp. 1-11.
Weiss, "Fast Median and Bilateral Filtering," ACM Transactions on Graphics, vol. 25, Issue 3, Jul. 2006, Proceedings of ACM SIGGRAPH 2006, pp. 519-526.
Paris, et al., "A Fast Approximation of the Bilateral Filter Using a Signal Processing Approach," Proceedings of the European Conference on Computer Vision, 2006.
Terdiman, "Radix Sort Revisited," 2000, http://www.codercorner.com/RadixSortRevisited.html.
Huang, "A Fast Two-Dimensional Median Filtering Algorithm," Acoustics, Speech, and Signal Processing [see also IEEE Transactions on Signal Processing], IEEE Transactions, vol. 27, Issue 1, Feb. 1979, pp. 13-18.
Huttunen, H. & Yli-Harja, O., "Fast Algorithm for Updating the Local Histogram of Multidemensional Signals," Proceedings 1999 International Symposium on Nonlinear Theory and Its Applications (NOLTA '99), Hilton Waikoloa Village, Hawaii, USA, Nov. 28-Dec. 2, 1999, pp. 65-68.
Giovanni Garibotto, Livio Lambarelli, "Fast on-line Implementation of Two-Dimensional Median Filtering," Electronics Letters, vol. 15, No. 1, Jan. 4, 1979, pp. 24-25.
Qimei Hu, et al. "Mutli-scale edge detection with bilateral filtering in apiral architecture," Proceedings of the Pan-Sydney area Workshop on Visual Information Processing VIP '05, publisher: Australian Computer Society, Inc.
Transactions on Graphics (TOG), Proceedings of the 29th annual conference on computer graphics and interactive techniques SIGGRAPH '02, vol. 21, issue 3.
U.S. Appl. No. 12/323,009, filed Nov. 25, 2008.
U.S. Appl. No. 11/292,184, filed Nov. 29, 2005.

* cited by examiner

IMAGE PROCESSING USING ENCLOSED BLOCK CONVOLUTION

BACKGROUND

1. Field of the Invention

The present invention is directed to computer systems. More particularly, it is directed to image processing.

2. Description of the Related Art

Image processing often involves the performance of various filtering operations on image data using one or more convolution operations. For example, box filters are typically implemented using a series of convolution steps performed across the rows and columns of an image. These convolutions may involve large numbers of operations on subsets of the input image data, and are often implemented by applying a kernel of support over the image in a sliding window. Different techniques for speeding up convolutions on image data have been developed, but may not be suitable for certain operations.

One example of a technique for speeding up convolutions is a prior art technique for fast box filters that involves the use of running histograms. Pyramidal data-structures have also been used in the past to accelerate various image processing algorithms. MIP maps, for instance, are sometimes used to store a filtered pyramid of a base image. Such pyramids are typically used when approximating a linear additive rectangular filter by finding a corresponding level of the pyramid and interpolating entries. MIP maps, which are constructed using down sampling, may be pre-computed and used in future convolutions. However, the results of these convolutions are not as accurate as the results of convolutions performed on original or exact image data.

Another prior art technique for speeding up convolutions involves summed-linear tables, where an exact additive convolution can be computed over a one-dimensional array of pixels using two table look-ups. This approach is extended in two dimensions to summed-area tables, where, with four table look-ups, the rectangular convolution may be computed. However, convolutions using linear sum tables lack numerical precision because a linear sum table stores the indefinite integral to the left of each pixel. The finite integral is then computed using the difference between two indefinite integrals. This can lead to the computation of small differences between large numbers. For finite precision floating point systems, this can lead to quantizing errors in some portions of the image, and is especially apparent for summed-area tables in two dimensions.

The prior art techniques described above may not be suitable for fast convolutions of certain filtering operations. For example, max filters have historically required either explicit convolution or the building of binary trees on the fly, both of which may be slow and may not be sped up using the techniques described above.

SUMMARY

A system and method for performing convolutions on image data using pre-computed acceleration data for enclosed blocks of pixels is disclosed. The method may be applied to convolutions that involve performing associative operations on pixel values of an input image, such as addition, multiplication, max, min, binary AND, and binary OR operations. In some embodiments, these convolutions are performed by a software graphics application as part of various filtering functions. Note that, as used herein, the term "input image" may refer to an original image (such as one input from a digital camera or scanner, or created using a graphical design application) or may itself be a modified image (e.g., one that has previously been compressed, filtered, or otherwise altered by a graphics application or other application). It may also refer to a portion of an image on which a convolution is to be performed, rather than to a complete image.

The method may in some embodiments involve dividing pixel information for an input image into a plurality of blocks, each of which includes pixel values for the same number of pixels. For example, each block may include pixel values for two or four adjacent pixels in the same row, or for four or eight pixels in a two-dimensional block of pixels. In some embodiments, the blocks may include a number of pixel values equal to a power of two (e.g., 2, 4, 8, 16, etc.). In general, a block of pixels may include any number of pixel values.

For each of the plurality of blocks, the method may include performing an associative operation on the pixel values included in the block and storing the result as an intermediate convolution value in an acceleration data structure. In some embodiments, each intermediate convolution value may be associated with the block for which it was calculated and may be addressed using an index value that is dependent on an index value of one of the pixels in the block. The acceleration data structure may include a number of intermediate convolution values (which may also be referred to as pixel values of the accelerated image) equal to the original number of pixels in the input image divided by the number of pixels in each block.

The method may in some embodiments include the generation of more than one acceleration data structure, or an acceleration data structure that includes acceleration data for blocks of two or more different sizes, or for two or more associative operations. For example, an acceleration data structure may include acceleration data for block sizes of two, four, and eight pixels, and may be referred to as an image pyramid. Such a pyramid may include a successively smaller number of intermediate convolution results at each acceleration level. In some embodiments, data for each acceleration level may be included in a different acceleration data structure, such as a different acceleration data table, while in others data for two or more acceleration levels may be included in a single acceleration data structure. In some embodiments, one or more additional acceleration data structures may be generated using a different associative operator, or acceleration data generated using two or more associative operators may be included in a single acceleration data structure in which each entry includes an indication of the operator used to generate it.

The method for performing exact convolutions using the pre-computed acceleration data may include determining that one or more of the blocks are enclosed in a given kernel of the image. In some embodiments, the method may include determining the largest block (or blocks) for which an intermediate convolution value has been pre-computed, and then determining any smaller, non-overlapping blocks that are also enclosed in the kernel. For all of the identified non-overlapping blocks and any pixels not included in any blocks for which intermediate convolution results are available, the method may include performing the associative operation on the pre-computed intermediate convolution results and the pixel values of the pixels included in the kernel (but not included in the blocks) to produce a convolution result for the kernel. The convolution result may then be used to render a second image that is different from the input image.

The methods described herein may be applied to multiple kernels of an image by repeating the operations described for additional kernels. For example, the operations may be repeated for each kernel corresponding to pixels in a row of an input image and then for each kernel corresponding to pixels on successive other rows of the input image. In another example, the operations may be repeated for each kernel corresponding to pixels in a row of an input image and then repeated for kernels in columns that include the convolution results for the kernels corresponding to each row (such as to implement a box filter.) The methods may also be applied to kernels of different sizes and/or shapes, in some embodiments. For example, a filtering algorithm for an image may operate differently on different portions of an input image, and may use spatially varying kernels to apply the convolution operation differently to the different portions of the image.

The methods described herein may be implemented by program instructions executable by one or more general-purpose processors (CPUs) and/or one or more graphics processing units (GPUs) in different embodiments. In some embodiments, the acceleration data structures described herein may be generated by program instructions executing in parallel on one or more CPUs or GPUs configured for parallel execution. For example, calculation of intermediate convolution results for different blocks (and/or for different associative operators) may be performed by different threads of an application executing on a CPU configured for multi-threaded execution, or by different GPUs configured to operate in parallel. Similarly, calculation of convolution results for different kernels may be performed in parallel on a CPU configured for multi-threaded execution or by different GPUs configured to operate in parallel, in different embodiments. The methods disclosed herein may be implemented by program instructions comprised on one or more computer-readable storage media computer-executable by CPU(s) and/or GPU(s) in various embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must).

Similarly, the words "include", "including", and "includes" mean including, but not limited to.

DETAILED DESCRIPTION OF EMBODIMENTS

The system and methods disclosed herein for performing enclosed block convolution may provide a technique for computing exact convolutions with associative operators. The system may use pre-computed acceleration data structures (e.g., one-dimensional or multi-dimensional image pyramids) along with addressing logic to combine wholly enclosed blocks using their representations in the image pyramid. The system and methods may be applied to graphics applications that support various filtering functions implemented using associative operations, such as min, max and sum filtering of images. The techniques disclosed herein may be executed on graphics processing units (GPUs) and/or CPUs, in various embodiments. They may also be used in graphics applications to support convolution using spatially varying kernel sizes (i.e., convolution using differently sized and/or shaped convolution kernels for different portions of an image.)

As described above, convolution is commonly used in image processing, such as in various filtering techniques. For example, a graphics application may include support for filtering to achieve blurring, anti-aliasing and/or blending by performing convolutions using associative operations on the pixels of an input image Traditionally, convolution is performed on an input image by passing a window (also called the "support") across the image. An output pixel value corresponding to each given input pixel value may be calculated by computing a weighted sum of all the input pixels in the window when the given pixel is in a particular position in the window (e.g., in a particular corner, or in the center of the window.) The weight applied to each of the input pixels may be specified for each pixel of the window. The window including its weights may be referred to as the "convolution kernel."

Figure 1:
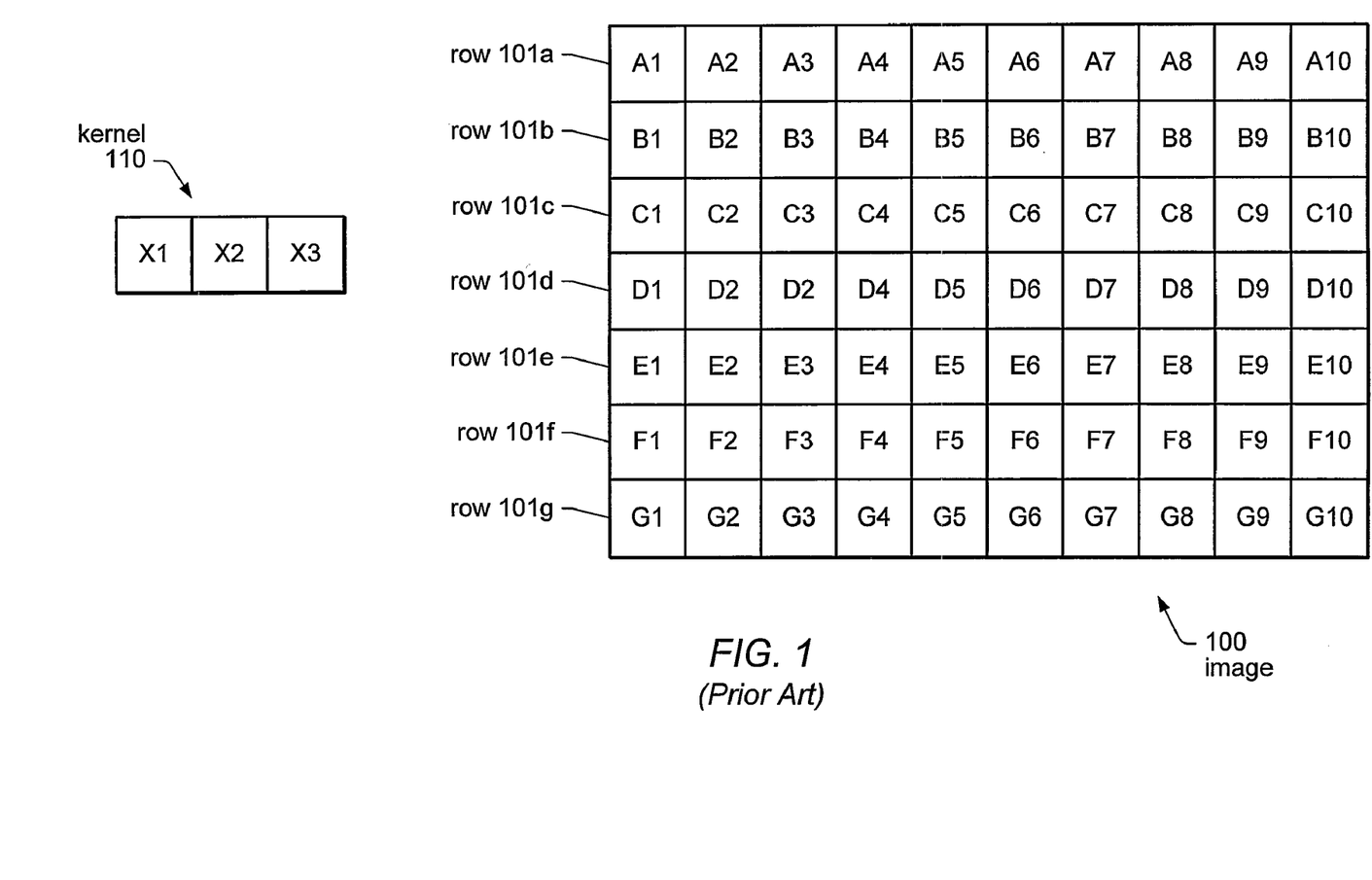
FIG. 1 illustrates convolution of an image according to the prior art.

FIG. 1 illustrates an image 100 over which a convolution kernel 110 may be passed to perform such a convolution operation using prior art methods. In this example, the kernel is one-dimensional and includes three pixels (X1, X2, and X3), although in other embodiments a convolution kernel may be multi-dimensional and may include any arbitrary number of pixels. In this example, to compute the value of the pixels for a new image, the convolution kernel 110 may be applied to image 100 as follows. To compute an output value corresponding to input pixel A1 on row 101a, the convolution kernel may be applied to the pixels A1, A2, and A3. The computed value of the output pixel would be:

$A1\_output = A1*X1 + A2*X2 + A3*X3$

Similarly, the output pixel corresponding to input pixel A2 on row 101a would be:

$A2\_output = A2*X1 + A3*X2 + A4*X3$

In this example, each of the output pixels corresponding to the input pixels of row 101a may be calculated as:

$AN\_output = AN*X1 + A(N+1)*X2 + A(N+2)*X3.$

Calculations for output pixels corresponding to input pixels at the edge of an image may be performed in different ways. For example, in some convolution operations, the weighted sum for edge pixels may be truncated to include fewer addends (e.g., $A9\_output = A9*X1 + A10*X2$, and $A10 = A10*X1$.) In other convolution operations, the weighted sum for edge pixels may be calculated by applying an average weighting for the edge pixels (e.g., an average of X1, X2, and/or X3), or by applying another algorithm.

In the example illustrated in FIG. 1, the kernel may be passed across each row, one at a time, to compute output pixels corresponding to the input pixels of image 100. For example, after kernel 110 is passed across row 101a, it may be passed across each of rows 101b-101g. The output pixels corresponding to the input pixels in these rows may be calculated in the same manner as that described for row 101a. For example, B1_output=B1*X1+B2*X2+B3*X3, and G8_output=G8*X1+G9*X2+G10*X3.

Traditional convolution methods using a sliding window, such as the example illustrated in FIG. 1 and described above, are easily implemented using a general-purpose processor, or CPU. For example, a CPU may calculate each output point by storing a previous result, and then subtracting and/or adding terms included in the next window position. However, these methods can be slow and do not lend themselves to execution by modern GPUs. For example, they cannot exploit the parallelism of some GPUs, because the calculations for one window depend on the results of the calculation of another.

The system and methods disclosed herein may be well-suited to take advantage of the parallelism of GPUs for pre-computing acceleration data structures and/or for computing convolutions using the pre-computed acceleration data structures. For example, the pre-computations at each acceleration level may be calculated in parallel from only the original pixels values. Similarly, the convolution result value for each kernel may not be dependent on the convolution result value for any other kernels. The system and methods may use the pre-computed values stored in the acceleration tables (e.g., image pyramids) along with enclosed block addressing logic to rapidly compute a wide variety of operations applied to the pixels inside a kernel. In some embodiments, one or more image pyramids may be pre-computed for an entire image (or for a portion thereof) and these computations may be re-used in one or more convolution operations. For example, an image pyramid may be built for each applicable (i.e., associative) operation that may be used in image filtering applications, e.g., addition, multiplication, min, max, matrix multiplication, binary AND, binary OR, or any other associative operations.

Each acceleration image (or acceleration table) may include an arbitrary number of acceleration levels, from 2–M. For one-dimensional convolutions, at each level i, the original image may be reduced by a factor of $2^{i-1}$, in some embodiments. For example, in a factor-of-two image pyramid, level 1 may be half the size of level 0, the original image. The value of each pixel of level 1 in the image pyramid may be pre-computed by applying the associative operator to two pixels from level 0. For example, in an image pyramid for an addition operation, the value of the first pixel in level 1 may be equal to the sum of the first and second pixel values of the original image. The value of the next pixel in level 1 may be equal to the sum of the third and fourth pixel values of the original image, and so on.

In another example, for a one-dimensional image (e.g., a scan line) with 64 pixels performing a convolution for a max filter, a graphics application may iterate on the original image or may allocate another image (an acceleration image) having 32 pixels, each of which stores a value equal to the maximum value of two pixels from the original image. In this example, each block of two pixels in the original image (which may be referred to as $P^0$) maps to one pixel in the accelerated image ($P^1$). To build an image pyramid, pre-computations may be repeated to generate higher-level images, in some embodiments. For example, a next level in the image pyramid ($P^2$) may include 16 pixels, each of which stores a value equal to the maximum value of two pixels of the previous level ($P^1$), which is also equivalent to the maximum value of four pixels from the original image ($P^0$). Therefore, each block of four pixels in $P^0$ may map to one pixel in $P^2$. Similarly, level $P^3$ of the image pyramid may include 8 pixels, each of which stores the maximum value of two pixels from level $P^2$, which is equivalent to the maximum value of a block of eight pixels from the original image ($P^0$). While in this example each successive level of the image pyramid includes one-half the number of pixels of the previous level, in other embodiments there may be a different ratio between the number of pixels in a given level of an image pyramid and the next level of the image pyramid (i.e., the number of pixels in each block of the next level may not correspond to the next highest factor of two.)

To use an image pyramid, as described above, in performing a convolution on a kernel, a graphics application may be configured to look at the kernel's range and determine the blocks of pixels for which acceleration values exist that are entirely enclosed in the kernel's range. For example, the application may be configured to determine the largest blocks that are enclosed by the kernel first, then to determine successively smaller blocks until the kernel's range is covered. The graphics application may access the pre-computed values for those blocks and may perform the convolution operation on the pre-computed values rather than on the values of all of the individual pixels of the kernel. For example, for an add operation, the sum of the pre-computed values for the enclosed blocks of a kernel may be equal to the sum of the pixel values of the pixels in the kernel of the original image. In another example, the minimum value of the pre-computed values for the enclosed blocks of a kernel may be equal to the minimum value of the pixel values of the pixels in the kernel of the original image.

Figure 2:
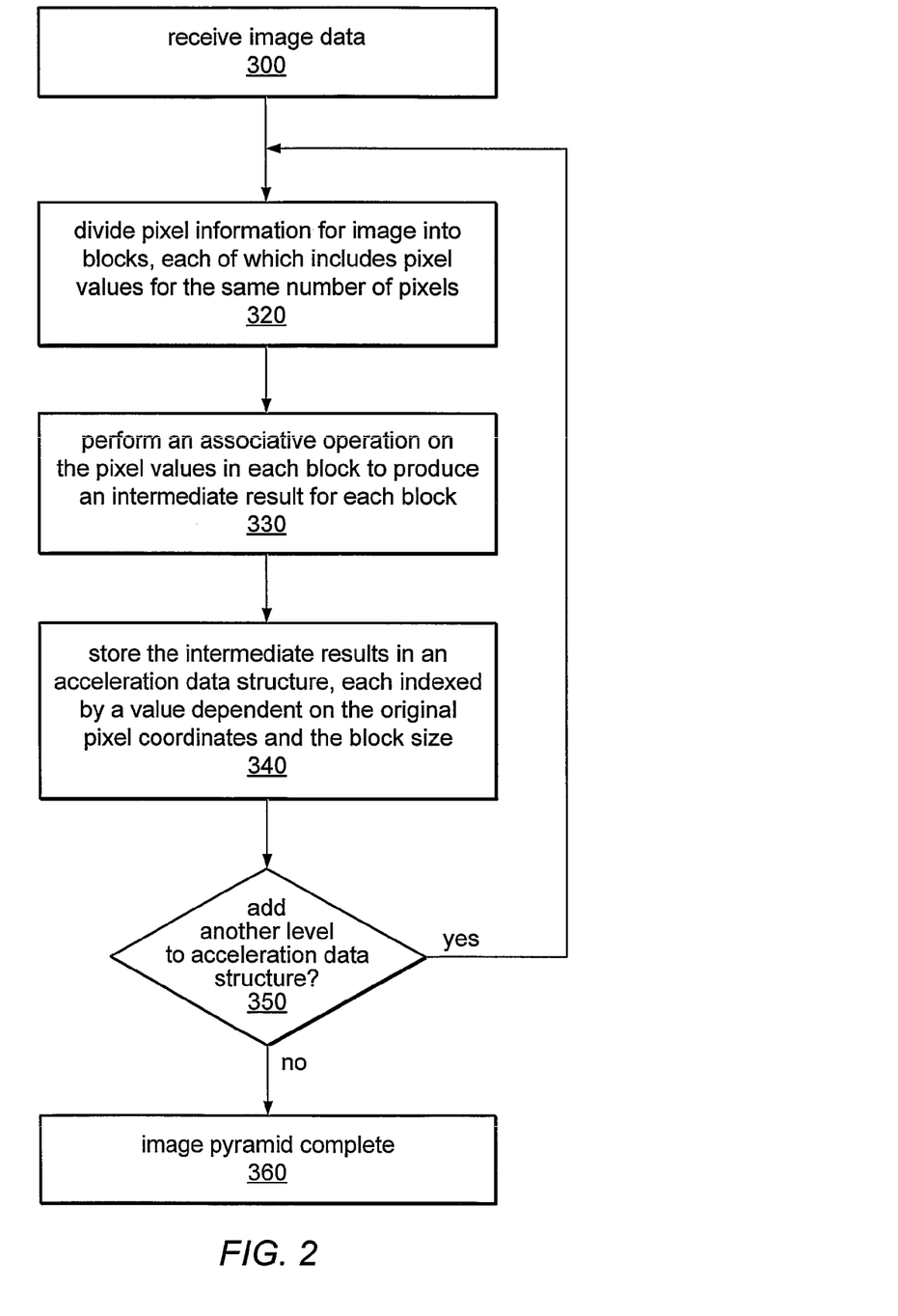
FIG. 2 is a flow chart illustrating one embodiment of a method for generating an acceleration data structure.

One embodiment of a method for pre-computing an acceleration data structure for one or more convolutions, as described herein, is illustrated in FIG. 2. In this example, image data is accessed, as in 300. For example, an image file containing the values associated with each pixel of a given image may be opened and/or displayed on a computer system by a user executing a software application configured to operate on the image data. The pixel values may indicate a color, intensity, and/or other property of the pixels, in different embodiments.

As illustrated in FIG. 2, the method may include dividing the pixel information for the image into blocks, as in 320. Each block may include the pixel values for a given region of the image, and each may include the same number of pixels. For example, each block may include the pixel values for two adjacent pixels, eight adjacent pixels, or four pixels in a two-dimensional section of the image (e.g., a 2×2 square of four pixels.) In some embodiments, if the pixels of the image cannot be divided evenly among blocks of the same size (e.g., if the number of pixels is not divisible by the block size), some of the pixels may not be included in any of the blocks. For example, if the block size is eight pixels in a horizontal line, and each scan line of the image (i.e., each row of pixels) contains 2923 pixels, there may be three pixels not included in any of the blocks of the image. These three pixels may include some of the first and/or last pixels in each row, in different embodiments.

As shown at 330, the method may include performing an associative operation on the pixel values in each block to produce an intermediate convolution result for each block. For example, if the convolution operation is addition, the values of each pixel in a block may be added together to produce a sum of those values for the block. Similarly, if the convolution operation is a binary AND, the values of each pixel in a block may be AND-ed together to produce an intermediate convolution result for the block.

As illustrated in FIG. 2, the method may include storing the intermediate results in an acceleration data structure, as in 340. Each of the intermediate results may be indexed in the data structure by a value dependent on the original pixel coordinates for the pixels in the associated block and/or on the block size. For example, in a case in which each block includes a one-dimensional collection of four adjacent pixels, the number of blocks may be approximately equal to one-fourth of the total number of pixels in the image (e.g., there may be fewer than one-fourth of the total number of pixels if the total number of pixels is not divisible by four.) Each of the blocks, and their corresponding intermediate convolution results, may be indexed by a value that is equal to one-fourth of a value representing the position of one of the pixels in the block (e.g., a first, last, or center pixel). In this example, the third block of pixels in the first row of the image may be indexed as the position of the first pixel in the block (e.g., 8) divided by the number of pixels in each block (e.g., 4), for an index value of 2. In some embodiments, the index values may include a single component representing the position of a block. For example, the index values of the blocks on the first row of the image may range from 0 to n−1, where n is the number of pixels on the row divided by the number of pixels in each block; the index values of the block on the second row of the image may range from n to 2n−1; the index values of the blocks on the third row may range from 2n to 3n−1; and so on. In other embodiments, the index value may include multiple components, such as one representing a row and another representing a position within a row.

The data structure in which intermediate convolution values may be stored may be implemented as one or more tables, databases, or other data structures stored in memory on one or more computer systems, in various embodiments. For example, the data structure may be implemented as a database on a single node of a computing system or may be implemented as a distributed data structure, portions of which are located and/or replicated on two or more nodes of a computing system.

As illustrated in FIG. 2, the method may in some embodiments include adding additional levels to the acceleration data structure. This is illustrated as the positive exit from 350. If additional levels are to be added, the operations illustrated in 320-340 may be repeated for one or more different block sizes. For example, the image data may first be divided into blocks of two pixels each, then four pixels, eight pixels, sixteen pixels, etc. In some embodiments, for each iteration of the operations 320-340, additional information may be added to a single acceleration data structure, e.g., forming an image pyramid having a successively smaller number of intermediate results for successively larger block sizes. In other embodiments, an additional table, database, or other data structure may be generated for each iteration of the operations 320-340 (i.e., one for each different block size.)

Since the methods described herein are directed toward convolutions involving associative operations, in some embodiments, rather than generating new levels of the image pyramid by performing an associative operation on the original pixel values (e.g., the pixel values of the input image) the method may include generating new levels of the image pyramid by performing the associative operation on the acceleration values stored on a lower level. For example, if each of the acceleration values of the third level (level 3) of the pyramid represents an intermediate convolution result for a block of eight pixels, it may be generated by performing the associative operation on eight original pixel values (from level 0), four acceleration values from the first level of the pyramid (level 1), or two acceleration values from the second level of the pyramid (level 2), in different embodiments.

Once all desired acceleration data has been computed, shown as the negative exit from 350, the image pyramid may be complete, as in 360. While the example illustrated in FIG. 2 is described above in terms of a single associative operation, the method may be repeated for more than one associative operation, in some embodiments. For example, in some embodiments, an acceleration data structure may be generated for each of two or more commonly used associative operations, such as those used in filter operations supported by a graphics or image processing software application. In some embodiments, separate acceleration data structures may be generated for each associative operation (e.g., one or more for addition, one or more for finding a maximum value, and one or more for binary OR), while in other embodiments a single data structure may be configured to store acceleration data for multiple associative operations (e.g., using an additional identifier or index component for each entry indicating the operation used to generate it.)

Figure 3:
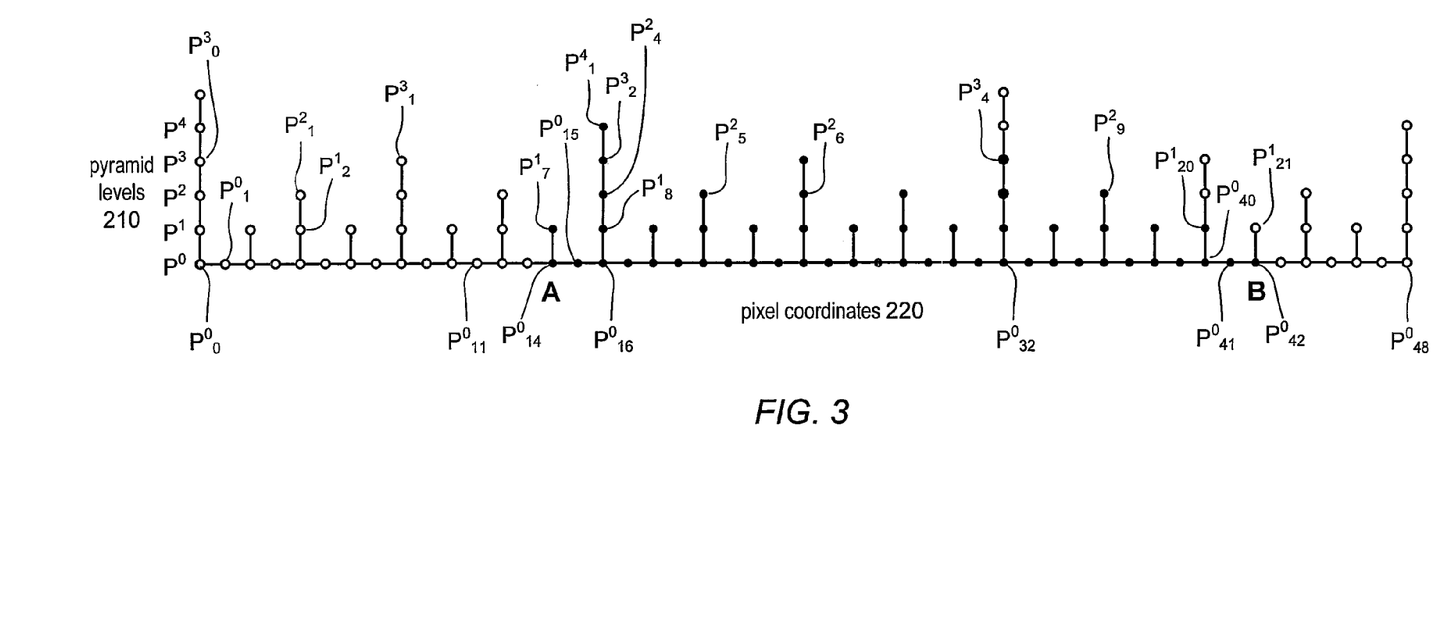
FIG. 3 is a conceptual diagram illustrating pixel values in an image pyramid, according to one embodiment.

To further illustrate the acceleration data structure described herein, FIG. 3 depicts a conceptual diagram of an image pyramid for one-dimensional enclosed block convolution geometry, according to one embodiment. In this example, the points along the horizontal axis represent pixels in a single row (e.g., a single scan line) of an image, in order of their location within the row. Each point has a pixel value, indicating a color, intensity, and/or other property of the pixel. Each of the points, some of which are labeled, may be referred to as $P^1_n$, where 1 represents the level of the point, and n represents the position of the point in the row. For example, the pixel value at $P^0_0$ represents the color, intensity, and/or other property of the leftmost pixel in the row. In this example, all of the points along the horizontal axis represent the actual (e.g., original) pixels of an input image. Therefore, their level in the corresponding pyramid data structure is 0. Each of the points on the $P^1$ level (i.e., those located immediately above the $P^0$ points) represents an acceleration data value for a block of two pixels. For example, the value of $P^1_7$ is the result of an associative operation on the pixel values at $P^0_{14}$ and $P^0_{15}$. Similarly, the value of $P^1_{20}$ is the result of an associative operation on the pixel values at $P^0_{40}$ and $P^0_{41}$. In this example, each of the points on the $P^2$ level represents an acceleration value for a block of four pixels. For example, the value of $P^2_4$ is the result of an associative operation on the pixel values at $P^0_{16}$, $P^0_{17}$, $P^0_{18}$, and $P^0_{19}$. As described above, the acceleration values for each of the points on a given level may be generated by performing an associative operation on the pixels values of the input image, or on acceleration values for a lower level of the acceleration data structure, in different embodiments.

Pixel values for one or more accelerated images (i.e., image pyramid data) may be stored in any appropriate data structure, including, but not limited to, one or more tables, databases, lists, linked lists, or arrays, in various embodiments. The table below, Table 1, illustrates one example of the data that may be stored at the second level ($P^1$) of an image pyramid for an addition operation. In this example, the first column illustrates an index value associated with each of the pixels of the accelerated image at this level, and the second column illustrates a calculation for the value of each of the pixels of the accelerated image at this level. For example, the value of the pixel associated with index value 2 may be calculated as the sum of the values of the fourth and fifth pixels of the original image. The result of each calculation may be stored in a table, database, or other suitable data structure, along with the index value, in some embodiments. In some embodiments, additional information, such as an identifier of the acceleration level, an identifier of the associative operator, or a list of pixels corresponding to a block of pixels in the original image represented by each value (as shown in column 3) may also be stored with each index value.

TABLE 1

| $P^1$ index | accelerated pixel value | pixels in corresponding block of original image |
|---|---|---|
| 0 | $P^1_0 = P^0_0 + P^0_1$ | $P^0_0, P^0_1$ |
| 1 | $P^1_1 = P^0_2 + P^0_3$ | $P^0_2, P^0_3$ |
| 2 | $P^1_2 = P^0_4 + P^0_5$ | $P^0_4, P^0_5$ |
| ... | ... | ... |
| n | $P^1_n = P^0_{2n} + P^0_{2n+1}$ | $P^0_{2n}, P^0_{2n+1}$ |

In a second example, Table 2 illustrates the data that may be stored at the third level ($P^2$) of an image pyramid for a min filtering operation. In this example, the first column illustrates an index value associated with each of the pixels of the accelerated image at this level, the second column illustrates a calculation for the value of each of the pixels of the accelerated image at this level, and the third column illustrates an alternate method of calculating the value of each pixel in the acceleration image. For example, the value of the pixel associated with index value 2 may be calculated as the minimum of the values of the eighth, ninth, tenth, and eleventh pixels of the original image, or may be calculated as the minimum of the values of the fourth and fifth pixels of a second level ($P^1$) of the image pyramid. The result of either of these calculations for each index value may be stored in a table, database, or other suitable data structure, along with the index value, in some embodiments. In some embodiments, additional information, such as an identifier of the acceleration level, an identifier of the associative operator, or a list of pixels corresponding to a block of pixels in the original image represented by each value (as shown in column four) may also be stored with each index value.

TABLE 2

| $P^2$ index | accelerated pixel value | alternate calculation of accelerated pixel value | pixels in block of original image |
|---|---|---|---|
| 0 | $P^2_0 = \min(P^0_0, P^0_1, P^0_2, P^0_3)$ | $P^2_0 = \min(P^1_0, P^1_1)$ | $P^0_0, P^0_1, P^0_2, P^0_3$ |
| 1 | $P^2_1 = \min(P^0_4, P^0_5, P^0_6, P^0_7)$ | $P^2_1 = \min(P^1_2, P^1_3)$ | $P^0_4, P^0_5, P^0_6, P^0_7$ |
| 2 | $P^2_2 = \min(P^0_8, P^0_9, P^0_{10}, P^0_{11})$ | $P^2_2 = \min(P^1_4, P^1_5)$ | $P^0_8, P^0_9, P^0_{10}, P^0_{11}$ |
| ... | ... | ... | ... |
| n | $P^2_n = \min(P^0_{4n}, P^0_{4n+1}, P^0_{4n+2}, P^0_{4n+3})$ | $P^2_n = \min(P^1_{2n}, P^1_{2n+1})$ | $P^0_{4n}, P^0_{4n+1}, P^0_{4n+2}, P^0_{4n+3}$ |

The block addressing mechanism described above may facilitate efficient software coding of the algorithms used to generate acceleration data structures and/or to perform enclosed block convolution, as will be described in more detail below.

In different embodiments, each acceleration data structure may include only one level of acceleration data or may include two or more levels of acceleration data. For example, additional columns may be used to identify the particular acceleration level for each table entry. Similarly, in different embodiments, an acceleration data structure may include acceleration data for only one associative operation or for more than one associative operation. For example, additional columns may be used to identify the associative operation performed to calculate each table entry. Any or all of the acceleration data described above may be pre-computed for an entire image, or for any portion thereof, when an image is opened in a graphics application, when a filter is first selected for operating on an image, or at any time during execution of a graphics application, in various embodiments.

As previously noted, acceleration data may be pre-computed by a software application executing in parallel on two or more GPUs, in some embodiments. For example, an acceleration table may be generated for one level of acceleration on one graphics processor while an acceleration table is generated for another level of acceleration on a second graphics processor. In another example, an acceleration table may be generated for one associative operation on one graphics processor while an acceleration table for another associative operation is generated on a second graphics processor. In yet another example, acceleration data may be generated for one portion of an image on one graphics processor while acceleration data for another portion of the image is generated on a second graphics processor. The acceleration data generated by multiple processors in any of these examples, or in other embodiments, may all be stored in one acceleration data structure or may be partitioned into multiple acceleration data structures, as described above.

A method for performing enclosed block convolution using an acceleration data structure may be further described in the following examples. In this first example, a linear kernel of finite support may operate over a range of pixel values in an image. FIG. 3, for example, may denote a one-dimensional image in which a kernel is being evaluated on image $P^0$ over a range of pixels A, A+1, A+2, . . . B, inclusive. The convolution may be expressed as follows:

$$C = P^0_A \Theta P^0_{A+1} \Theta P^0_{A+2} \Theta \ldots \Theta P^0_B$$

In this equation $\Theta$ represents the convolution operator, C represents a convolution result for a kernel, and A and B represent index values used to address the original pixels. If the convolution operator is associative in nature, intermediate convolution results may be pre-computed for groups of pixels, and the results for each of the groups may be combined together, such as:

$$C = P^0_A \Theta (P^0_{A+1} \Theta P^0_{A+2}) \Theta \ldots \Theta P^0_B$$

As noted above, examples of associative operators include addition, multiplication, max, min, matrix multiplication, binary AND, and binary OR. As described above, an acceleration image $P^1$ that is a whole number ratio R smaller than the original image $P^0$ may be pre-computed, where each pixel in the acceleration image represents a block of R pixels in the original image. The acceleration image may be initialized by computing the operator result of the R pixels in the source image. If R is two, indicating a factor-of-two image pyramid, the convolution result for the kernel may be computed using one of the following four cases:

For even values of A and B, the convolution kernel may be computed using:

$$L=A/2$$

$$U=B/2$$

$$C=(P^1_L \Theta P^1_{L+1} \Theta \ldots \Theta P^1_U)$$

In this example, L represents an index value for the first acceleration pixel on level $P^1$ associated with the kernel, i.e., an index of the lower bound of the kernel on level $P^1$. Similarly, U represents an index value for the last acceleration pixel as represented on level $P^1$ associated with the kernel, i.e., an index of the upper bound of the kernel as represented on level $P^1$. As described above and illustrated in Tables 1 and 2, each pixel on level $P^1$ may be indexed by a value that is equal to one-half of the value of the index of one of the pixels of level $P^0$ in the pair represented by the pixel on level $P^1$ (i.e., the pixel having an even index.) In this case, the convolution kernel value may be computed as the convolution of the pixel values of level $P^1$ having index values from L to U.

For odd values of A and even values of B, the convolution kernel may be computed using:

$$L=(A+1)/2$$

$$U=B/2$$

$$C=P^0_A \Theta (P^1_L \Theta P^1_{L+1} \Theta \ldots \Theta P^1_U)$$

In this example, the lower bound of the kernel on level $P^1$ is adjusted so that it corresponds to an even index boundary on level $P^0$, but the upper bound of the kernel on level $P^1$ does not need to be adjusted. In this case, the convolution kernel value may be computed as the convolution of the pixel values of level $P^1$ having index values from L to U, plus the pixel value of the pixel on level $P^0$ having the index A, since this pixel is not represented by any of the values of the pixels on level $P^1$.

For odd values of B and even values of A, the convolution kernel may be computed using:

$$L=A/2$$

$$U=(B-1)/2$$

$$C=(P^1_L \Theta P^1_{L+1} \Theta \ldots \Theta P^1_U) \Theta P^0_B$$

In this example, the upper bound of the kernel on level $P^1$ is adjusted so that it corresponds to an even index boundary on level $P^0$, but the lower bound of the kernel on level $P^1$ does not need to be adjusted. In this case, the convolution kernel value may be computed as the convolution of the pixel values of level $P^1$ having index values from L to U, plus the pixel value of the pixel on level $P^0$ having the index B, since this pixel is not represented by any of the values of the pixels on level $P^1$.

For odd values of A and B, the convolution kernel may be computed using:

$$L=(A+1)/2$$

$$U=(B-1)/2$$

$$C=P^0_A \Theta (P^1_L \Theta P^1_{L+1} \Theta \ldots \Theta P^1_U) \Theta P^0_B$$

In this example, both the upper bound and the lower bound of the kernel on level $P^1$ are adjusted so that they correspond to even index boundaries on level $P^0$. In this case, the convolution kernel value may be computed as the convolution of the pixel values of level $P^1$ having index values from L to U, plus the pixel values of the pixel on level $P^0$ having the indexes A and B, since these pixels are not represented by any of the values of the pixels on level $P^1$.

Indexing acceleration data using the method described above may in some embodiments simplify the program instructions needed to address each value in the acceleration data structures to perform enclosed block convolution. This will be illustrated by way of several pseudo-code examples below. Other indexing methods for mapping acceleration data to the blocks they represent may be used in other embodiments. For example, in one embodiment, the index value associated with each pixel in an acceleration data structure may be dependent on an index value of a center or last pixel index value in a block, rather than on the first pixel in a block. In other embodiments, any other suitable method may be used to map each pixel in an acceleration data structure to the block that it represents.

Figure 4:
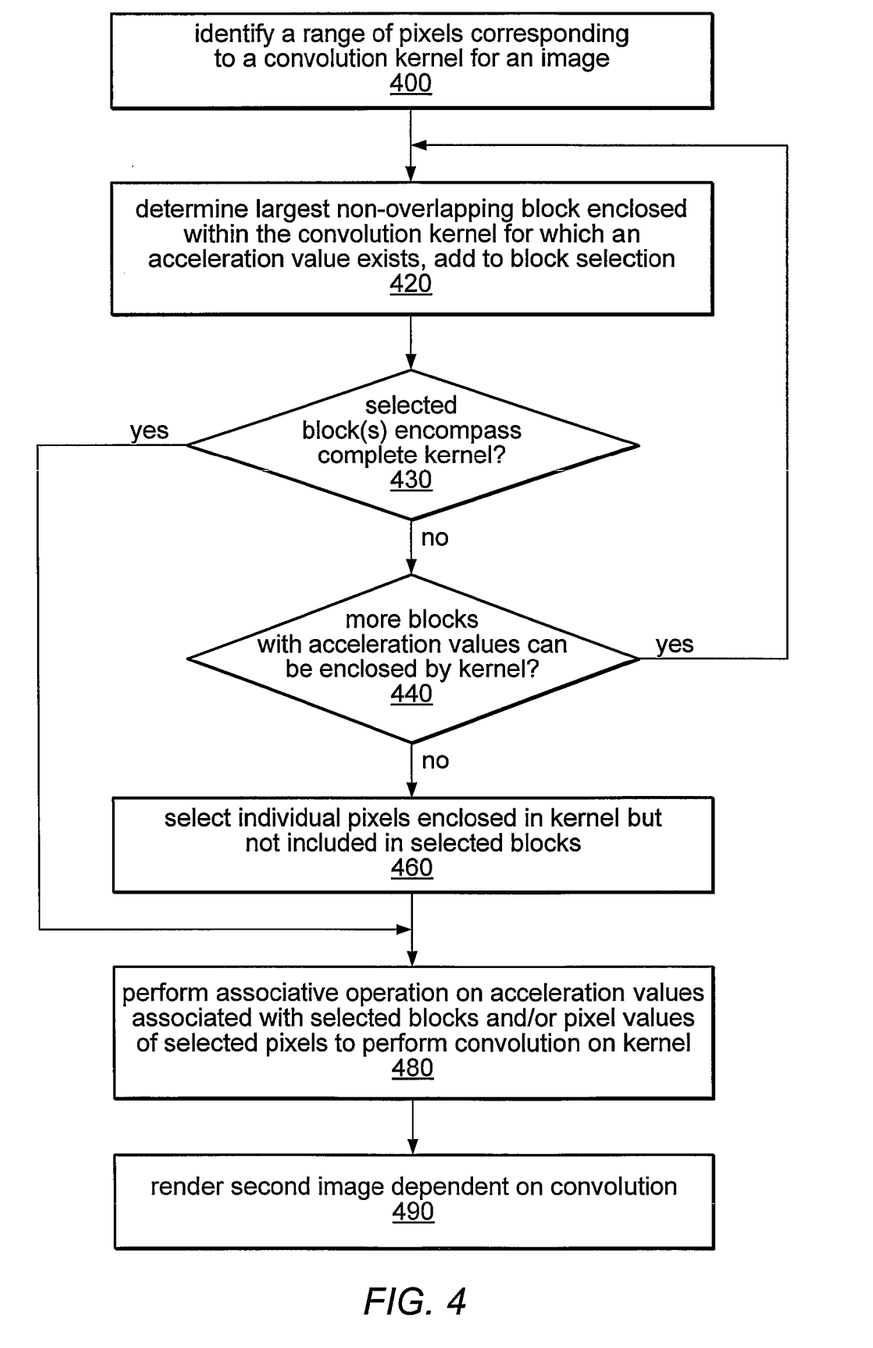
FIG. 4 is a flowchart illustrating one embodiment of a method for performing enclosed block convolution, as described herein.

As described herein, an acceleration data structure (e.g., an image pyramid) may in some embodiments be accessed when performing a convolution for a range of pixels in an input image. FIG. 4 illustrates a method for using an acceleration data structure to perform such a convolution. At 400, a range of pixels in an image corresponding to a convolution kernel may be identified. For example, if the convolution involves performing an operation on a group of pixels that is twelve pixels wide, the group of twelve pixels may be identified in the image. Similarly, if the convolution involves performing an operation on a group of pixels that is eight pixels wide and six pixels tall, the method may include identifying the group of pixels to be operated on. Identifying the range of pixels corresponding to the convolution kernel may involve receiving or otherwise determining an identifier of the first pixel in the group and the last pixel in the group, or a list of identifiers of the pixels in the group, in different embodiments. For example, for a one-dimensional convolution, identifying the pixels corresponding to the convolution kernel may involve identifying the index values of the first and last pixels in the kernel.

In the example illustrated in FIG. 3, the values stored at the $P^0$ level are the original image values, those stored at the $P^1$ level represent two pixels each, and so on. In this example, if the range of the convolution kernel is from pixel A to pixel B (inclusive), the bold (solid) points represent acceleration values for blocks of different sizes that are completely enclosed by the kernel. As described above, to perform an associative operation (such as a sum or the identification of a maximum value) on the kernel, the operation may be performed on the values pre-computed for any combination of non-overlapping blocks that includes all of the pixels A to B. In other words, enclosed blocks may be selected such that each pixel from $P^0_{14}$-$P^0_{42}$ is included in at most one of the selected blocks.

In the example illustrated in FIG. 3, several different combinations of blocks may be selected for the kernel range A to B. A first combination may include fourteen of the values on level $P^1$ (i.e., those that were pre-computed for the blocks represented by $P^1_7$-$P^1_{20}$), plus the value of $P^0_{42}$. A second combination may include six values from level $P^2$ (the values at $P^2_4$-$P^2_9$), plus two values from level $P^1$ (the values at $P^1_7$ and $P^1_{20}$), and one value from level $P^0$ (the value at $P^0_{42}$). A third combination may include three values from level $P^3$ (those at $P^3_2$-$P^3_4$), plus two values from level $P^1$ (the values at $P^1_7$ and $P^1_{20}$), and one value from level $P^0$ (the value at $P^0_{42}$). A fourth combination may include one value from level $P^4$ (the value at $P^4_1$), plus one value from level $P^3$ (the value at $P^3_4$), two values from level $P^1$ (the values at $P^1_7$ and $P^1_{20}$), and one value from level $P^0$ (the value at $P^0_{42}$). In an alternate embodiment, a block that contains a relatively large number of pixels in the kernel of interest may be selected, even if not all of the pixels contained in the block are included in the kernel. In such cases, the values associated with any pixels contained in the block but not included in the kernel may be removed when calculating an associative operation on the kernel. For example, if the operation for the kernel from pixel A to B is addition, fifteen values from level $P^1$ may be added together (the values at $P^1_7$-$P^1_{21}$) and the value of $P^0_{43}$ may be subtracted from the total. Note that a similar approach may be applicable to some, but not necessarily all, associative operations.

As shown in the example illustrated in FIG. 4, the method may in some embodiments include determining the largest non-overlapping block enclosed within the convolution kernel for which an acceleration value has been pre-computed, as in 420. In the example described above and illustrated in FIG. 3, this would be the block of sixteen pixels represented by the pre-computed value at $P^4_1$. The method may include determining if this block encompasses the complete kernel, as in 430. In the example described above, the value at $P^4_1$ encompasses the pixels from $P^0_{16}$ to $P^0_{31}$, which is not the entire kernel. If the largest block does not encompass the entire kernel, shown as the negative exit from 430, the method may include determining if there are acceleration values available for additional blocks enclosed by the kernel, as in 440.

If there are additional blocks enclosed by the kernel, shown as the positive exit from 440, the method may include determining the next largest non-overlapping block enclosed within the kernel, as in 420. In the example described above and illustrated in FIG. 3, the next largest non-overlapping block enclosed in the kernel would be the block of eight pixels represented by the pre-computed value at $P^3_4$. This block includes the pixels from $P^0_{32}$-$P^0_{40}$. At 430, it is again determined whether the selected blocks compass the complete kernel. In this example, the two blocks selected so far include the pixels $P^0_{16}$-$P^0_{40}$, which is still not the entire kernel. Therefore, the operations illustrated at 440, 420, and 430 may be repeated until all possible non-overlapping blocks have been selected that include pixels in the kernel of interest. In the example described above and illustrated in FIG. 3, no blocks represented by values on level P2 are non-overlapping blocks that include additional pixels of the kernel from A to B. The next largest blocks would be identified in the next two iterations of the operations at 440, 420, and 430, and are those represented by the values $P^1_7$ and $P^1_{20}$. These additional blocks include the pixels $P^0_{14}$, $P^0_{15}$, $P^0_{40}$, and $P^0_{41}$. With the addition of these blocks, the pixels P041-P041 are encompassed, and no additional blocks may be enclosed by the kernel. This is shown as the negative exit from 440.

Once all of the blocks having pre-computed acceleration values that are enclosed within the kernel are selected, the method may include selecting any individual pixels that are enclosed in the kernel, but that are not included in the selected blocks, as in 460. In the described above and illustrated in FIG. 3, the only pixel included in the kernel but not in the selected blocks is $P^0_{42}$.

As illustrated at 480 of FIG. 4, once all the blocks and individual pixels have been selected for the kernel of interest, the method may include performing an associative operation on the acceleration values associated with the selected blocks and/or the pixel values of selected individual pixels to perform the convolution operation on the kernel. For example, if the associative operation is addition, the values of $P^4_1$, $P^3_4$, $P^1_7$, $P^1_{20}$, and $P^0_{42}$ in an acceleration data structure for addition may be added together to calculate the sum of the values $P^0_{14}$-$P^0_{42}$. Similarly, if the associative operation is finding a minimum value, the minimum of the values of $P^4_1$, $P^3_4$, $P^1_7$, $P^1_{20}$, and $P^0_{42}$ in an acceleration data structure for minimum values may be identified and will correspond to the minimum of the values $P^0_{14}$-$P^0_{42}$.

Once the convolution result for the kernel has been calculated, the method may include rendering a second image dependent on the result of the convolution, as in 490. For example, if the convolution operation is performed as part of a filtering operation by a graphics application, the application may be configured to render a new image after completing each of one or more convolution operations.

As noted above, acceleration data structures may be pre-computed for any associative operations and/or for any number of acceleration levels from input image data, in different embodiments. For example, if the acceleration data structure illustrated in FIG. 3 included fewer acceleration levels (e.g., only levels $P^0$-$P^3$), the largest block selected to enclose the kernel from A to B in the example above would be at level $P^3$. In that case, a larger number of acceleration values (corresponding to a larger number of smaller blocks) may have been used to calculate the convolution operation for the kernel.

The operations illustrated in FIG. 4 may be repeated to perform convolution operations over multiple kernels of an image, in some embodiments. For example, the convolution may be performed by repeating the operations illustrated in FIG. 4 for two or more other kernels in a same row or column of an input image and a second image may be rendered dependent on the convolution results for all of the kernels on which convolutions have been performed, rather than on the computation of a convolution result for a single kernel. For example, in one embodiment, a box filter may be implemented by first performing the convolution operation on kernels in each row of an image, and then performing the convolution operation on the results of the convolution operation on the rows (e.g., by performing the convolution on columns of the results.) The result of the final convolution operation may be used to render a new image according to the box filter applied.

In some embodiments, the operations illustrated in FIG. 4 may be repeated for kernels of different sizes or shapes. In other embodiments, convolutions for different kernels may use different associative operators. For example, a graphics application may use kernels of different dimensions for different portions of an input image (e.g., on the edges vs. the middle, or on portions containing similar pixel values vs. portions with widely varying pixel values). Similarly, a graphics application may perform different filtering operations (e.g., those that involve different associative operations) on different portions of an input image. In various embodiments, different iterations of the operations illustrated in FIG. 4 may be performed in parallel on one or more CPUs or GPUs configured for parallel execution, as described herein.

The system and methods described herein may in some embodiments be implemented entirely in software, while in other embodiments they may be implemented using a combination of hardware and software components. For example, a graphics application implementing enclosed block convolution may be executed largely in software on one or more general purpose CPUs, in some embodiments. In other embodiments, a graphics application implementing enclosed block convolution may be executed on special purpose GPUs using large amounts of parallelism, as described above. In still other embodiments, the methods may be supported by additional dedicated hardware components, such as special purpose registers for storing acceleration data, or specialized logic for providing database or filtering functions. The memory requirement of the enclosed block convolution algorithm may in some embodiments be as low as a single scanline pyramid, such as when an image pyramid is computed on the fly just before being used. In other embodiments in which memory may not be a limiting factor, one or more acceleration data structures may be pre-computed and stored while an image is being processed (e.g., during an image editing session using a graphics application) or may be stored indefinitely in memory once computed (e.g., to be used later for various filtering operations.)

Another formulation of an approach for implementing enclosed block convolution using one level of acceleration for a kernel from pixel A to B is described below. As in the previous example, the pixel level corresponding to the original image is referred to as $P^0$ and the pixel level corresponding to the first acceleration image is referred to as $P^1$. For this example, the approach may be illustrated using the pseudocode below. The first five lines serve to initialize particular variables:

$L_0 = A$ //Lower index of pixels in level 0 enclosed by the kernel range $L_1 =$ ceiling $(A/R)$ //Lower index in level 1 enclosed by the kernel range $U_0 = B+1$ //Upper index of pixels in level 0 enclosed by the kernel range +1

$U_1 =$ floor $((U0)/R)$ //Upper index in level 1 enclosed by the kernel range +1

C=Initial convolution result value

In this example, the initial convolution result value is dependent on the particular associative operator used in the convolution:

Initial convolution result=0 if $\Theta$==+

Initial convolution result=1 if $\Theta$==*

Initial convolution result=$P^0_A$ if $\Theta$==min, or max

Initial convolution result=1 if $\Theta$==AND

Initial convolution result=0 if $\Theta$==OR

The first loop includes the convolution of any pixels on a first edge of a kernel that are not included in an enclosed block represented by a value on level $P^1$ (i.e., any pixels between A and the next even index value boundary on level $P^1$, including A.)

For (i=$L_0$; i<$L_1$*R; i++)
{
C=C$\Theta P^0_i$
}

The second loop includes the convolution of pixels included in any enclosed blocks represented by values on level $P^1$:

For (i=$L_1$; i<$U_1$; i++)
{
C=C$\Theta P^1_i$
}

The third loop includes the convolution of any pixels on a second edge of a kernel that are not included in an enclosed block represented by a value on level $P^1$ (i.e., pixels between the last even index value boundary enclosed in the kernel and B, inclusive.)

For (i=$U_1$*R; i<$U_0$; i++)
{
C=C$\Theta P^0_i$
}

The approach described above may explicitly include pixels on the outer edges of a kernel in the convolution, but may use pre-computed acceleration data for the interior of the kernel (e.g., for pixels included in enclosed blocks.) This approach may in some embodiments use either floating point or integer math, and may be extended to an M layer pyramid as illustrated below. First, the upper and lower limits may be initialized:

$L_0 = A$ //Lower index of pixels in level 0 enclosed by the kernel range $U_0 = B+1$ //Upper index of pixels in level 0 enclosed by the kernel range+1

Using this approach, a graphics application may be configured to determine the largest block enclosed in the kernel for which acceleration data exists. In this example, the upper and lower index values ($L_i$ and $U_i$) for each level (M) of the image pyramid being built may be computed using floating-point math or integer math, in different embodiments. In some embodiments, such as those implemented by one or more GPUs, floating point math may be required and/or the floating-point math version may execute more efficiently. In other embodiments, the integer math version of the algorithm may be more efficient.

If (useFloatingPointMath)
{
For (i=1; i<M; i++)
{
$L_i$=ceil($L_{i-1}$/R)
$U_i$=floor($U_{i-1}$/R)
}
}
Else
{
//Assume R=(1<<rBits); i.e., R is a power of two
For (i=1; i<M; i++)
{
$L_i$=($L_{i-1}$+R−1)>>rBits
$U_i$=($U_{i-1}$)>>rBits
}
}

With this approach, the convolution result value may be initialized dependent on the associative operator being used in the convolution, as described above.

C=Initial product value

The first loop includes the convolution of any pixels and/or blocks on a first edge of a kernel that are not included in an enclosed block represented by a value on the highest acceleration level, $P^{M-1}$, (i.e., any blocks and/or pixels to the left of the largest block(s) enclosed by the kernel.)

For (j=0; j<M−1; j++)
{
For (i=$L_j$; i<$L_{j+1}$*R; i++)
{
C=C$\Theta P^j_i$
}
}

The second loop includes the convolution of pixels included in any enclosed blocks represented by values on level $P^{M-1}$. In other words, this loop includes the convolution of pixels included in any enclosed block represented by a value at the highest acceleration level in the pyramid.

For (i=$L_{M-1}$; i<$U_{M-1}$; i++)
{
C=C$\Theta P^{M-1}_i$
}

The third loop includes the convolution of any blocks and/or pixels on a second edge of a kernel that are not included in an enclosed block represented by a value on level $P^{M-1}$ (i.e., pixels and smaller blocks in the kernel to the right of the largest block(s) enclosed by the kernel.)

```
For (j=M−2; j>=0; j−−)
{
  For (i=U_{j+i}*R; i<U_j; i++)
  {
    C=C⊖P^j_i
  }
}
```

In the example above, a flag such as the "useFloatingPoint-Math" flag may be used to indicate whether or not floating-point math is to be used, while in other embodiments another mechanism may be used to indicate whether floating-point math is to be used. In still other embodiments, floating point math may always be used or may never be used.

In some embodiments, the algorithm described above may be optimized if M is the maximum level of the pyramid that could contain an enclosed block of pixels in the kernel.

Enclosed block convolution, as described herein, may be used to accelerate associative operations within one-dimensional or multi-dimensional kernels. Because there is no sharing of state with neighboring pixels, the convolution may be done from scratch at each pixel. Therefore, the algorithm may in some embodiments map well to gather-only filters as expressed by modern graphics processing units (GPUs). In fact, in some embodiments it may be possible to express enclosed block convolution on GPU hardware using modern shading languages. As previously noted, the use of enclosed block convolution may support convolutions over images in which the size and/or shape of the kernel being evaluated at each pixel may be varied from pixel to pixel. In addition, as described herein, enclosed block convolution may be used on operators not previously supported efficiently, such as min, max, OR and AND.

While the examples described herein involve simple addition, min and max operations on a group of input image pixels, the system and methods described herein may in some embodiments be applied to other convolutions, such as convolutions involving other types of data, or more complex operations (as long as they are associative in nature). For example, a filtering algorithm that adds the same number to each pixel before adding them together, or that multiplies each pixel by the same number before adding them together may be supported using the methods described herein to pre-compute acceleration data structures for blocks of data and re-using these computations in computing a convolution result for a kernel. In addition to the associative operations described herein as being useful in graphics applications, convolutions involving other associative operations may be supported in other embodiments. For example, in different embodiments, the methods may be applied to multiplication and addition of complex numbers, greatest common divisor and least common multiple functions, intersection and union of sets (similar to binary AND and OR functions), and linear transformations of various types (which may or may not be represented as matrix multiplications). When applied to computations involving determining a greatest common divisor, for example, an acceleration data structure may be pre-generated that stores the prime factors of values associated with a block of pixels of an original image. The acceleration data structure values associated with each non-overlapping block enclosed in a given convolution kernel (along with the prime factors of any remaining individual pixels enclosed by the kernel but not included in any block for which an acceleration data value has been computed) may be used to compute the greatest common divisor for the given convolution kernel.

As previously noted, enclosed block convolution may in some embodiments be applied to multi-dimensional kernels as well as one-dimensional kernels. In particular, for non-linear filters, performing convolutions using a spatially varying kernel may require a full two-dimensional implementation. For a two-dimensional kernel where W (width) and H (height) are not spatially varying, the algorithms described herein may in some embodiments be used in a separable manner, running first horizontally and then vertically across the kernel (or vice versa). In other words, a two-dimensional convolution may be treated as a series of convolutions of H rows of pixels, and an intermediate convolution result for each row may be computed using one-dimensional enclosed block convolution. For example, applying enclosed block convolution to rows of an image, and then to columns of the result may lead to a very efficient two-dimensional box filter, although the general ability to vary the kernel size between pixels may be lost.

Alternatively, the methods described herein may be applied directly to multi-dimensional blocks of pixels (e.g., blocks of 2×2×2 or 4×2×3 pixels) by creating one or more acceleration images each containing fewer pixels than an original multi-dimensional image. In such embodiments, each pixel of each acceleration image may have a value representing an intermediate convolution result for a corresponding multi-dimensional block of pixels, rather than for a linear group of pixels. Convolutions over a given kernel may then be computed using these acceleration images by identifying a combination of non-overlapping multi-dimensional blocks enclosed within a convolution kernel (and any remaining individual pixels enclosed within the kernel but not within any of the multi-dimensional blocks for which acceleration data values have been computed) and performing the convolution operation on the intermediate convolution results associated with each of the blocks and the values associated with any remaining individual pixels. Such a method may be applied, for example, to computations involving volumetric calculations on three-dimensional image data (e.g., for medical imaging applications.) In embodiments in which such multi-dimensional convolutions are supported, the block addressing mechanisms described herein may be extended to apply to the multi-dimensional acceleration data. For example, each entry in an acceleration data structure may be associated with a multiple-component index value (e.g., one specifying a multi-dimensional position in an original image or in an acceleration image).

The system and methods described herein may in some embodiments be easily applied to convolutions for varying size kernels, unlike a sliding window method. For a spatially varying kernel, e.g., where the width may change based on the position of the center of the kernel, the enclosed block algorithm described herein may in some embodiments be executed separately for each horizontal span of pixels. In such embodiments, a graphics application performing a convolution operation on each kernel may access the pre-computed values it needs for any combination of non-overlapping blocks enclosed in each kernel. As noted above, the convolutions for multiple kernels may be executed in parallel, with each accessing the values it needs from one or more acceleration data structures.

Figure 5:
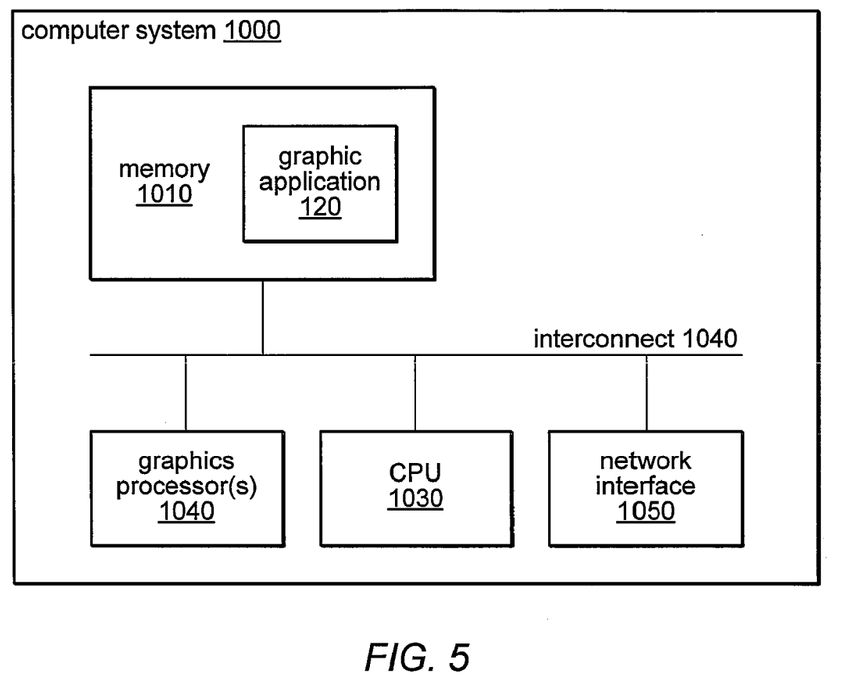
FIG. 5 is a block diagram illustrating one embodiment of a computer system capable of implementing enclosed block convolution, as described herein.

FIG. 5 is a block diagram illustrating one embodiment of a computer system 1000 suitable for implementing enclosed block convolution, as described herein. As noted above, a graphics application such as graphics application 120 may be configured to perform convolutions on image data as part of various filtering functions and to render new images according to the convolutions. For example, graphics application 120 may perform blurring, anti-aliasing and/or blending by performing convolutions using associative operations on the pixels of an input image, according to some embodiments. Graphics application 120 may be configured to render the second image to a separate window (such as a compositing or layered window) or directly into the same frame buffer containing the original image, in different embodiments.

Graphics application 120 may represent various types of graphics applications, such as painting, publishing, photography, games, animation, and other applications. Additionally, graphics application 120 may utilize a graphics processor 1040 when rendering or displaying images according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 1040 may implement a number of graphics primitive operations in a way that makes executing them much faster than drawing directly to the screen with a host central processing unit (CPU), such as CPU 1030.

As described above, the methods disclosed herein for pre-computing acceleration data structures and/or the methods disclosed herein for performing enclosed block convolutions on multiple kernels of an image may be implemented by program instructions configured for parallel execution on two or more such GPUs.

Please note that functionality and/or features described herein as being part of, or performed by, graphics application 120 may, in some embodiments, be part of, or performed by, one or more graphics processors, such as graphics processor 1040. As described above, in some embodiments graphics application 120 may be configured to render altered images into a separate image layer or separate layered window than input images.

Enclosed block convolution, as described herein, may be implemented on various types of computer systems. Referring again to FIG. 5, computer system 1000 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Graphics application 120 described herein may be provided as a computer program product, or software, that may include a computer-readable storage medium having stored thereon instructions, which may be used to program a computer system (or other electronic devices) to implement enclosed block convolution, as described herein. A computer-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

A computer system 1000 may include a processor unit (CPU) 1030 (possibly including multiple processors, a single threaded processor, a multi-threaded processor, a multi-core processor, or other type of processor). The computer system 1000 may also include one or more system memories 1010 (e.g., one or more of cache, SRAM DRAM, RDRAM, EDO RAM, DDR RAM, SDRAM, Rambus RAM, EEPROM, or other memory type), an interconnect 1040 (e.g., a system bus, LDT, PCI, ISA, or other bus type), and a network interface 1050 (e.g., an ATM interface, an Ethernet interface, a Frame Relay interface, or other interface). The memory medium 1010 may include other types of memory as well, or combinations thereof. The CPU 1030, the network interface 1050, and the memory 1010 may be coupled to the interconnect 1040. It should also be noted that one or more components of system 1000 might be located remotely and accessed via a network. One or more of the memories 1010 may embody a graphics application 120.

In some embodiments, memory 1010 may include program instructions configured to implement graphics application 120, as described herein. Graphics application 120 may be implemented in any of various programming languages or methods. For example, in one embodiment, graphics application 120 may be JAVA based, while in another embodiments, it may be implemented using the C or C++ programming languages. In other embodiments, graphics application 120 may be implemented using specific graphic languages specifically for developing programs executed by specialize graphics hardware, such as GPU 1040. In addition, graphics application 120 may be embodied on memory specifically allocated for use by graphics processor(s) 1040, such as memory on a graphics board including graphics processor(s) 1040. Thus, memory 1010 may represent dedicated graphics memory as well as general-purpose system RAM.

Network interface 1040 may be configured to enable computer system 1000 to communicate with other computers, systems or machines, such as across network 100, described above. Network interface 1040 may use standard communications technologies and/or protocols. Network 100 may include, and network interface 1040 may utilize, links using technologies such as Ethernet, 802.11, integrated services digital network (ISDN), digital subscriber line (DSL), and asynchronous transfer mode (ATM) as well as other communications technologies. Similarly, the networking protocols used on network 100 may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over network 100 by network interface 1040 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 1040 may be implemented in a number of different physical forms. For example, GPU 1040 may take the form of a dedicated graphics card, an integrated graphics solution and/or a hybrid solution. GPU 1040 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 5, memory 1010 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth.

Hybrid solutions also share memory with the system memory, but have a smaller amount of memory on-board than discrete or dedicated graphics cards to make up for the high latency of system RAM. Data communicated between the graphics processing unit and the rest of the computer may travel through the graphics card slot or other interface, such as interconnect 1040 of FIG. 5.

While graphics application 100 has been described herein with reference to various embodiments, it will be understood that these embodiments are illustrative and that the scope of the present invention is not limited to them. Many variations, modifications, additions, and improvements are possible. More generally, the present invention is described in the context of particular embodiments. For example, the blocks and logic units identified in the description are for ease of understanding and not meant to limit the invention to any particular embodiment. Functionality may be separated or combined in blocks differently in various realizations or described with different terminology.

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A computer-implemented method, comprising:
   dividing pixel information for an image into a plurality of blocks, wherein each block comprises pixel values for a same number of pixels;
   for each of the plurality of blocks:
      performing an associative operation on the pixel values comprised in the block; and
      storing a result of said performing as an intermediate value in an acceleration data structure, wherein the intermediate value is associated with the block;
   determining that one or more of the plurality of blocks is enclosed in a given kernel of the image;
   accessing the intermediate values associated with each of the one or more of the plurality of blocks in the acceleration data structure;
   performing the associative operation on the intermediate values to produce a convolution result for the kernel; and
   rendering a second image dependent on the convolution result for the kernel.

2. The method of claim 1, wherein the associative operation is one of: addition, multiplication, determining a maximum value, determining a minimum value, matrix multiplication, a binary AND operation, and a binary OR operation.

3. The method of claim 1, further comprising:
   dividing pixel information for the image into a second plurality of blocks, wherein each block of the second plurality of blocks comprises pixel values for a second number of pixels;
   for each block of the second plurality of blocks:
      performing the associative operation on the pixel values comprised in the block; and
      storing a result of said performing as an intermediate value in the acceleration data structure, wherein the intermediate value is associated with the block;
   wherein the first intermediate values and the second intermediate values in the acceleration data structure comprise an image pyramid.

4. The method of claim 3,
   wherein said determining further comprises determining that one or more of the second plurality of blocks is enclosed in the given kernel of the image, wherein the one or more of the second plurality of blocks and the one or more of the plurality of blocks comprise non-overlapping pixel information;
   wherein said assessing further comprises accessing the intermediate values associated with each of the one or more of the second plurality of blocks in the acceleration data structure; and
   wherein said performing the associative operation on the intermediate values to produce a convolution result for the kernel comprises performing the associative operation on the intermediate values associated with each of the one or more of the plurality of blocks and the intermediate values associated with each of the one or more of the second plurality of blocks.

5. The method of claim 1, wherein each block comprises pixel values for a one-dimensional subset of the pixels that comprise the image.

6. The method of claim 1, wherein each block comprises pixel values for a multi-dimensional subset of the pixels that comprise the image.

7. The method of claim 1, further comprising repeating said determining, said accessing, said performing for one or more other kernels of the image; and wherein said rendering a second image is further dependent on one or more convolution results for the one or more other kernels.

8. The method of claim 7, wherein at least one of the one or more other kernels has different dimension than the given kernel.

9. The method of claim 7, wherein said performing for at least one of the one or more other kernels is executed on a different graphics processor than said performing for the given kernel.

10. The method of claim 9, wherein said performing for the least one of the one or more other kernels is executed in parallel with said performing for the given kernel.

11. The method of claim 1, further comprising:
repeating said determining, said accessing, said performing for one or more other kernels of the image on a same row of pixels as the given kernel; and
repeating said determining, said accessing, said performing for one or more other kernels of the image on a different row of pixels as the given kernel;
wherein said rendering a second image is further dependent on one or more convolution results for the one or more other kernels on the same row of pixels and one or more convolution results for the one or more kernels on the different row of pixels as the given kernel.

12. The method of claim 1, further comprising:
repeating said determining, said accessing, said performing for one or more other kernels on each row of pixels in the image; and
repeating said determining, said accessing, said performing for one or more other kernels on each column of convolution results for the one or more other kernels on each row of pixels in the given image;
wherein said rendering a second image is further dependent on one or more convolution results for the one or more other kernels on each row of pixels and one or more convolution results for the one or more kernels on each column of convolution results.

13. The method of claim 1, wherein each of the intermediate values in the acceleration data structure is addressed by an index dependent on an index value of a given pixel in the block with which it is associated.

14. A system, comprising:
one or more processors; and
a memory coupled to the one or more processors;
wherein the memory is configured to store program instructions executable by the one or more processors to implement:
dividing pixel information for an image into a plurality of blocks, wherein each block comprises pixel values for a same number of pixels;
for each of the plurality of blocks:
performing an associative operation on the pixel values comprised in the block; and
storing a result of said performing as an intermediate value in an acceleration data structure, wherein the intermediate value is associated with the block;
determining that one or more of the plurality of blocks is enclosed in a given kernel of the image;
accessing the intermediate values associated with each of the one or more of the plurality of blocks in the acceleration data structure;
performing the associative operation on the intermediate values to produce a convolution result for the kernel; and
rendering a second image dependent on the convolution result for the kernel.

15. The system of claim 14, wherein the associative operation is one of: addition, multiplication, determining a maximum value, determining a minimum value, matrix multiplication, a binary AND operation, and a binary OR operation.

16. The system of claim 14, wherein the program instructions are further executable by the one or more processors to implement:
dividing pixel information for the image into a second plurality of blocks, wherein each block of the second plurality of blocks comprises pixel values for a second number of pixels;
for each block of the second plurality of blocks:
performing the associative operation on the pixel values comprised in the block; and
storing a result of said performing as an intermediate value in the acceleration data structure, wherein the intermediate value is associated with the block;
wherein the first intermediate values and the second intermediate values in the acceleration data structure comprise an image pyramid.

17. The system of claim 16,
wherein said determining further comprises determining that one or more of the second plurality of blocks is enclosed in the given kernel of the image, wherein the one or more of the second plurality of blocks and the one or more of the plurality of blocks comprise non-overlapping pixel information;
wherein said assessing further comprises accessing the intermediate values associated with each of the one or more of the second plurality of blocks in the acceleration data structure; and
wherein said performing the associative operation on the intermediate values to produce a convolution result for the kernel comprises performing the associative operation on the intermediate values associated with each of the one or more of the plurality of blocks and the intermediate values associated with each of the one or more of the second plurality of blocks.

18. The system of claim 14, wherein each block comprises pixel values for a one-dimensional subset of the pixels that comprise the image.

19. The system of claim 14, wherein each block comprises pixel values for a multi-dimensional subset of the pixels that comprise the image.

20. The system of claim 14, wherein the program instructions are further executable by the one or more processors to implement repeating said determining, said accessing, said performing for one or more other kernels of the image; and wherein said rendering a second image is further dependent on one or more convolution results for the one or more other kernels.

21. The system of claim 20, wherein at least one of the one or more other kernels has different dimension than the given kernel.

22. The system of claim 20, wherein said performing for at least one of the one or more other kernels is executed on a different processor than said performing for the given kernel.

23. The system of claim 22, wherein said performing for the least one of the one or more other kernels is executed in parallel with said performing for the given kernel.

24. The system of claim 14, wherein each of the intermediate values in the acceleration data structure is addressed by an index dependent on an index value of a given pixel in the block with which it is associated.

25. A computer-readable storage medium, comprising program instructions computer-executable to implement:
- dividing pixel information for an image into a plurality of blocks, wherein each block comprises pixel values for a same number of pixels;
- for each of the plurality of blocks:
  - performing an associative operation on the pixel values comprised in the block; and
  - storing a result of said performing as an intermediate value in an acceleration data structure, wherein the intermediate value is associated with the block;
- determining that one or more of the plurality of blocks is enclosed in a given kernel of the image;
- accessing the intermediate values associated with each of the one or more of the plurality of blocks in the acceleration data structure;
- performing the associative operation on the intermediate values to produce a convolution result for the kernel; and
- rendering a second image dependent on the convolution result for the kernel.

26. The medium of claim 25, wherein the associative operation is one of: addition, multiplication, determining a maximum value, determining a minimum value, matrix multiplication, a binary AND operation, and a binary OR operation.

27. The medium of claim 25, wherein the program instructions are further executable to implement:
- dividing pixel information for the image into a second plurality of blocks, wherein each block of the second plurality of blocks comprises pixel values for a second number of pixels;
- for each block of the second plurality of blocks:
  - performing the associative operation on the pixel values comprised in the block; and
  - storing a result of said performing as an intermediate value in the acceleration data structure, wherein the intermediate value is associated with the block;
- wherein the first intermediate values and the second intermediate values in the acceleration data structure comprise an image pyramid.

28. The medium of claim 27,
- wherein said determining further comprises determining that one or more of the second plurality of blocks is enclosed in the given kernel of the image, wherein the one or more of the second plurality of blocks and the one or more of the plurality of blocks comprise non-overlapping pixel information;
- wherein said assessing further comprises accessing the intermediate values associated with each of the one or more of the second plurality of blocks in the acceleration data structure; and
- wherein said performing the associative operation on the intermediate values to produce a convolution result for the kernel comprises performing the associative operation on the intermediate values associated with each of the one or more of the plurality of blocks and the intermediate values associated with each of the one or more of the second plurality of blocks.

29. The medium of claim 25, wherein the program instructions are further executable to implement repeating said determining, said accessing, said performing for one or more other kernels of the image; and wherein said rendering a second image is further dependent on one or more convolution results for the one or more other kernels.

30. The medium of claim 29, wherein at least one of the one or more other kernels has different dimension than the given kernel.

31. The medium of claim 29, wherein said performing for at least one of the one or more other kernels is executed on a different processor than said performing for the given kernel.

32. The medium of claim 31, wherein said performing for the least one of the one or more other kernels is executed in parallel with said performing for the given kernel.

33. The medium of claim 25, wherein each of the intermediate values in the acceleration data structure are addressed by an index dependent on an index value of a given pixel in each block.

* * * * *